United States Patent
Wang et al.

(10) Patent No.: US 9,575,968 B2
(45) Date of Patent: Feb. 21, 2017

(54) INTELLIGENT DATA DELIVERY AND STORAGE BASED ON DATA CHARACTERISTICS

(71) Applicant: Apple Inc., Cupertino, CA (US)

(72) Inventors: Hui Carl Wang, San Mateo, CA (US); Oleg Zaydman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/726,394

(22) Filed: May 29, 2015

(65) Prior Publication Data

US 2015/0358384 A1    Dec. 10, 2015

Related U.S. Application Data

(63) Continuation of application No. 13/345,603, filed on Jan. 6, 2012, now Pat. No. 9,047,288.

(51) Int. Cl.
*G06F 15/16* (2006.01)
*G06F 17/30* (2006.01)
*H04L 29/08* (2006.01)
*H04L 29/06* (2006.01)

(52) U.S. Cl.
CPC ... *G06F 17/30017* (2013.01); *G06F 17/30867* (2013.01); *G06F 17/30899* (2013.01); *H04L 67/02* (2013.01); *H04L 67/06* (2013.01); *H04L 69/18* (2013.01)

(58) Field of Classification Search
USPC .......... 709/219, 201, 202, 203, 238
See application file for complete search history.

(56) References Cited

U.S. PATENT DOCUMENTS

| | | | |
|---|---|---|---|
| 6,128,653 A | * | 10/2000 | del Val ................ H04L 67/2823 709/203 |
| 6,138,163 A | | 10/2000 | Nam et al. |
| 6,144,641 A | | 11/2000 | Kaplan et al. |
| 7,068,680 B1 | | 6/2006 | Kaltenmark et al. |
| 7,715,324 B1 | | 5/2010 | Harvell et al. |
| 7,933,254 B2 | | 4/2011 | Frid-Nielsen et al. |
| 7,933,261 B2 | | 4/2011 | Kato |
| 9,047,288 B2 | | 6/2015 | Wang et al. |
| 2001/0023444 A1 | | 9/2001 | Torii |
| 2002/0022453 A1 | | 2/2002 | Balog et al. |

(Continued)

FOREIGN PATENT DOCUMENTS

| CN | 1653449 A | 8/2005 |
|---|---|---|
| CN | 1968276 A | 5/2007 |

(Continued)

OTHER PUBLICATIONS

Japanese Patent Application No. 2014-551364—Office Action dated Jul. 27, 2015.

(Continued)

*Primary Examiner* — Lan-Dai T Truong
(74) *Attorney, Agent, or Firm* — Downey Brand LLP

(57) ABSTRACT

Methods, program products, and systems of intelligent data delivery and storage based on data characteristics are disclosed. A database server can receive, from a user device, a request for data. The database server can determine a data size and a data type of the requested data. The database server can identify, based on the data size and data type, and from multiple candidate data delivery protocols for responding to the request, a data delivery protocol designated for delivering the data having the data size and data type. The database server can deliver the data to the user device in response to the request using the identified data delivery protocol.

18 Claims, 7 Drawing Sheets

(56) References Cited

U.S. PATENT DOCUMENTS

| | | | |
|---|---|---|---|
| 2003/0051142 A1* | 3/2003 | Hidalgo | H04L 63/04 713/176 |
| 2003/0172049 A1 | 9/2003 | Choy et al. | |
| 2004/0052214 A1* | 3/2004 | Teh | H04L 45/00 370/238 |
| 2005/0105530 A1 | 5/2005 | Kono et al. | |
| 2008/0075084 A1* | 3/2008 | Choi | H04L 45/00 370/392 |
| 2008/0114842 A1 | 5/2008 | Ellis et al. | |
| 2009/0195706 A1 | 8/2009 | Kikkawa et al. | |

FOREIGN PATENT DOCUMENTS

| | | |
|---|---|---|
| CN | 101026464 A | 8/2007 |
| CN | 101039278 A | 9/2007 |
| CN | 101047568 A | 7/2009 |
| CN | 101610303 A | 12/2009 |
| JP | H10-079771 | 3/1998 |
| JP | 2004-153775 | 5/2004 |
| KR | 1020080085258 A | 9/2008 |
| KR | 10-2010-0133205 | 12/2010 |

OTHER PUBLICATIONS

Japanese Patent Application No. 2014-551364—Office Action dated Dec. 11, 2015.

Chinese Office Action, CN Application No. 2103-80004814.6 dated Aug. 1, 2016 (18 pages).

Takashi Fukui et al. "Development of Compound Data Integration System with Business Process Management", DBSJ Letters, Japan, Dec. 18, 2003, Vol. 2, No. 3, p. 37-40.

* cited by examiner

INTELLIGENT DATA DELIVERY AND STORAGE BASED ON DATA CHARACTERISTICS

CROSS-REFERENCE TO RELATED APPLICATION

This application is a continuation of and claims priority to U.S. patent application Ser. No. 13/245,603, entitled "Intelligent Data Delivery and Storage Based on Data Characteristics," filed on Jan. 6, 2012, the entire contents of which is incorporated herein by reference.

TECHNICAL FIELD

This disclosure relates generally to database-backed web applications.

BACKGROUND

A database server can provide data stored in a database to a client located remotely from the database server. The database can include a collection of relations, frequently known as tables. A table in the database can include a set of data items or values that are organized using vertical columns and horizontal rows. Each column can have a data type that defines what category of data can be stored in the column. The type of a data column can be specified in a database schema, which can be a data model that defines how data in the relational database are represented or accessed. In a modern relational database, a data field can have a data type that permits storage of data having a large size compared to size of data items of other data fields. For example, multimedia data (e.g., movie clips) can be stored in a relational database.

SUMMARY

Methods, program products, and systems of intelligent data delivery and storage based on data characteristics are disclosed. A database server can receive, from a user device, a request for data. The database server can determine a data size and a data type of the requested data. The database server can identify, based on the data size and data type, and from multiple candidate data delivery protocols for responding to the request, a data delivery protocol designated for delivering data having the data size and data type. The database server can deliver the data to the user device in response to the request using the identified data delivery protocol.

The techniques described in this specification can be utilized to achieve the following advantages. The techniques allow a database server to cause multimedia data be delivered as a buffered stream from a HTTP server that is separate from the database server. The techniques can ease burden on the database server to deliver huge media data to a user device. The techniques can save bandwidth of a database connection for serving other conventional database requests.

The techniques allow for incremental delivery of data. If the data include a media file (e.g., audio or video), the data can be played or viewed incrementally by a user at a user device as the data reach the user device. The user device can appear to get multiple media files in response to a database query instantaneously and concurrently, rather than waiting for one media file to be delivered in the entirety before a next media file is delivered.

The details of one or more implementations of intelligent data delivery and storage are set forth in the accompanying drawings and the description below. Other features, aspects, and advantages of intelligent data delivery and storage will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
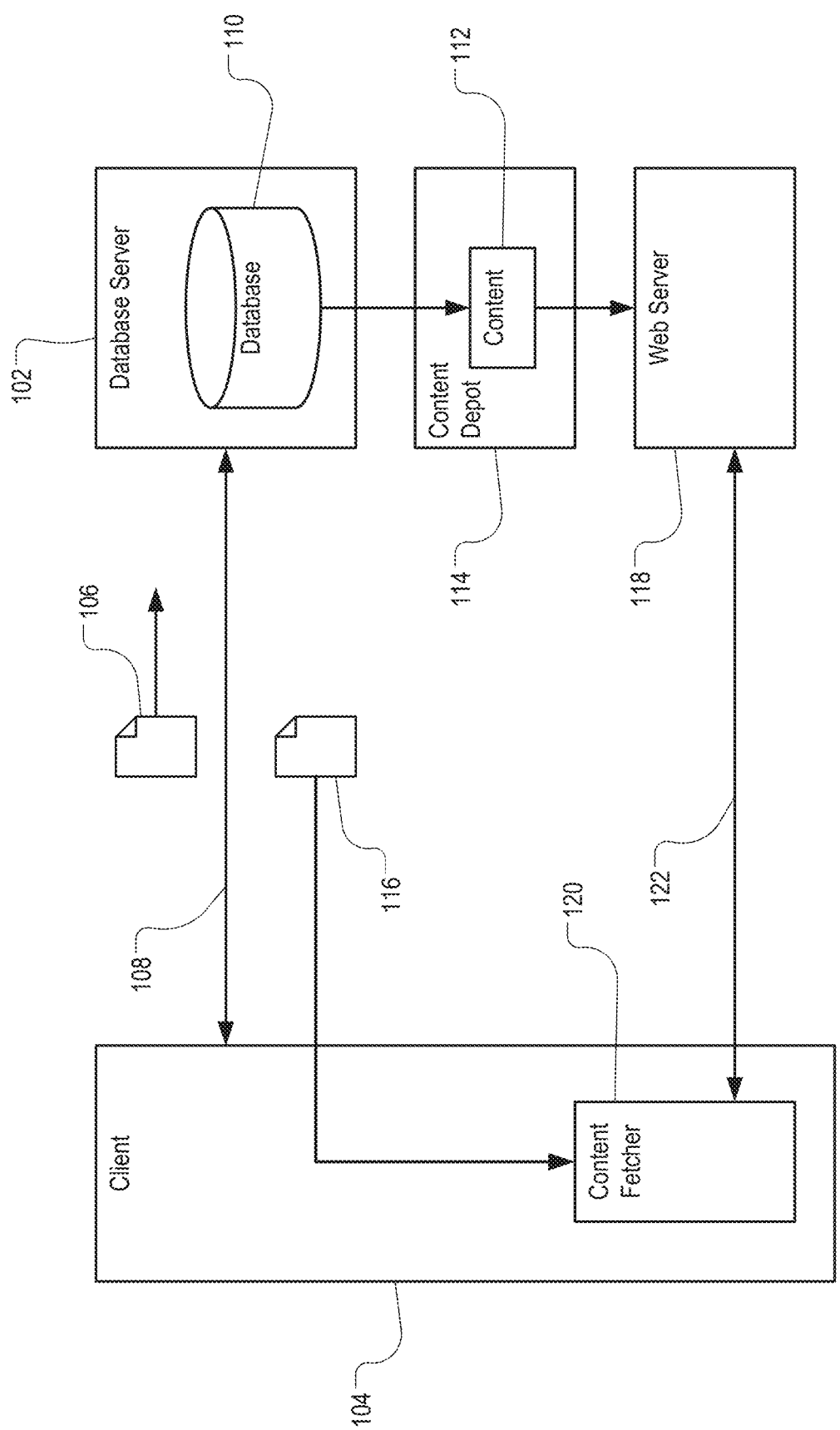
FIG. 1 is a block diagram illustrating an exemplary system implementing intelligent data delivery techniques.

FIG. 1 is a block diagram illustrating an exemplary system implementing intelligent data delivery techniques. Database server 102 can cause data to be delivered to client 104 in different manners and through different connections based on characteristics such as type or size of the data.

Database server 102 can receive request 106 from client 104 through database connection 108. Database connection 108 can be a connection between client 104 and database server 102 that facilitates communication including database requests and responses. Request 106 can be a database request (e.g., a database query). Request 106 can include a request for data stored in or referenced in database 110. Database 110 can be a collection of data organized as a relational database, an object oriented database, or an ad hoc database.

The data in database 110 can be organized as tables having columns and rows. Each column of data can have a data type. The data type can include, for example, integer data type, text data type, or container data type. Further details of a container data type will be described below in reference to FIG. 2. For some data types (e.g., text data type or container data type), the data can have a large size compared to other data (e.g., data having a Boolean data type). For example, a data item having a container data type can be a digital movie having a file size larger than one gigabyte (1 GB), whereas a data item having a Boolean data type can have a size of one byte.

Database 110 can be configured to store data items having a large size separately from other data items. For example, database 110 can be configured such that content 112, having a large size, is stored at content depot 114. Content depot 114 can be a storage device that is connected to database server through a communications network. A reference to content 112 can be stored with other data of database 110. Content 112 is managed and access through database 110. The location of content 112 is controlled by database 110.

Database server 102 can determine that database request 106 includes a request for data having a text type (text data) and a request for data having a container type (container data). Database server 102 can then determine that, in addition to text data, the container data to be returned in response to database request 106 include content 112.

Database server 102 sends database response 116 to client 104 through database connection 108. Database response 116 can include the text data requested in the database request 106. Instead of including the content 112, database response 116 can include a reference to content 112 and a reference to web server 118. Web server 118 can be a server configured to access content 112 separately from database 110. For example, web server 118 can be a hypertext transfer protocol (HTTP) server that is separate from database server 102.

Upon receiving database response 116, client 104 can determine that database response 116 includes references to container data. Client 104 can send the references to content fetcher 120. Content fetcher 120 is a software or hardware component of client 104 that is configured to retrieve content referenced in database response 116.

Upon receiving the references, content fetcher 120 can automatically open connection 122 to web server 118 according to the references in the database response 116. Content fetcher 120 can open connection 122 without user intervention. Connection 122 can be a network connection separate from database connection 108. Through connection 122, content fetcher 120 can send, without user intervention, a request to web server 118, which can return content 112 using a protocol (e.g., an HTTP streaming protocol) that is different from the database connection protocol. By sending content 112 separately from other database content, the system can ease the burden on database server 102 to deliver large media data to client 104, and allow a user at the client to view results of a database query substantially instantaneously, rather than waiting for the entire content to be delivered first. The operations of content fetcher 120 can be automatic and transparent to the user.

Exemplary Container Field

Figure 2:
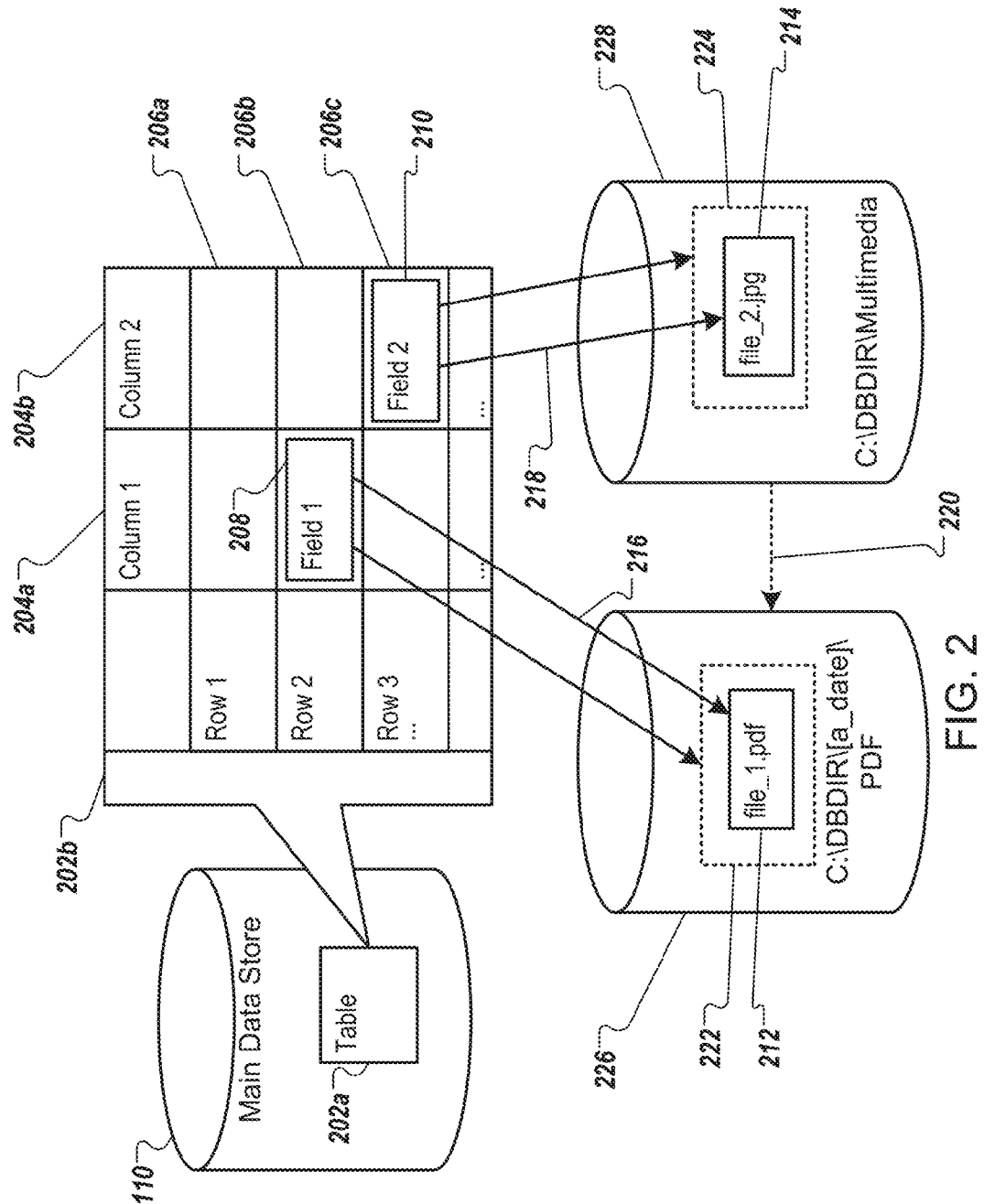
FIG. 2 illustrates exemplary container techniques used in intelligent data delivery.

FIG. 2 illustrates exemplary container techniques used in intelligent data delivery. A container data type allows some data (e.g., multimedia data) to be stored separately from other database data, and thus delivered through a connection to a client that is separate from a connection for delivering other database data.

Data of a relational database can be stored in database 110 (FIG. 1). Database 110 can include one or more database files for storing the data. In some implementations, database 110 can include a single database file that contains all data of the relational database.

The relational database can include one or more tables, one of which is table 202a. Table 202b illustrates an enlarged view of table 202a of the relational database as stored in database 110. Table 202b can include one or more columns, e.g., column 204a and 204b. Each of column 204a and 204b can have a container data type. Table 202b can include one or more rows, e.g., rows 206a, 206b, and 206c. Each of the rows can include one or more data fields corresponding to the columns. For example, row 206b can include container data field 208; row 206c can include container data field 210.

Actual content of container data fields 208 and 210 can be stored in database files 212 and 214, respectively. The system can assign a name to each of database files 212 and 214. A name of each of the database files 212 and 214 can be configured to be unique in the relational database.

Database files 212 and 214 can be located remotely from database 110 as well as remotely from a client computer of the system. The system can store one or more database files 212 and 214 in the same directory or file system where database 110 is stored, including a subdirectory of the directory where database 110 is stored. Additionally or alternatively, the system can store one or more database files 212 and 214 in a directory or a file system that is different from the directory or file system where database 110 is stored. A file system can include a system for organizing computer files for storage, manipulation, and retrieval by an operating system. A directory can include a virtual grouping within a file system in which one or more files or directories can be stored.

Container data fields 208 and 210 can each be related to database files 212 and 214, respectively. The relations (e.g., relations 216 and 218) can be implemented using remote containers associated with container data fields 208 and 210. A remote container can store a reference (e.g., a path) to database file 212 or 214. In some implementations, the path can include a base directory and a relative path. The base directory can be a highest-level directory of database files 212 and 214. The system can maintain multiple base directories. Each base directory can be located on a different storage device, or a mounted volume. The relative path can specify a subdirectory of the base directory.

For example, the system can store database file 212 using path "C:\DBDIR\[a_date]\PDF\file_1.pdf" in which "C:\DBDIR" is a base directory, "\[a_date]\PDF\" is a relative path, and "file_1.pdf" is a unique name. Database file 212 ("file_1.pdf") can be stored on first storage device 226. Likewise, the system can store database file 214, which can include multimedia content, using path "C:\DBDIR\Multimedia\file_2.jpg." Database file 214 can be stored on a second storage device 228. Storage device 228 can be a mounted volume (as indicated by dotted arrow 220) under base directory "C:\DBDIR\" using name "Multimedia." The base directory or base directories can provide a database administrator a central place (e.g., "C:\DBDIR\") to inspect the remote containers, restrictions for accessing the remote containers, and to remap the remote containers if needed. In some implementations, container data fields 208 and 210 can each store a reference to a remote container, which, in turn, can store a path to database file 212 or 214.

Data having a container data type are different from simple references (e.g., URLs) to external data. The data of a container data type, although stored separately from other database data, are part of database data managed and accessed through the database. For example, database 110 can determine a location and a path for storing database file 212 in response to an example insert statement of a structured query language (SQL) query as shown below.

INSERT INTO table_name(column 1)
    VALUES("my_file.pdf"); (1)

When database 110 determines that "column 1" has a container data type, the database can upload the file "my_file.pdf" into the system as database file 212, and give the uploaded file a system name (e.g., "file_1.pdf"), rather than inserting a string "my_file.pdf" into the database.

In addition, the remote containers can store information that can be used to manage access restrictions 222 and 224 of database files 212 and 214, respectively. The information can include one or more keys for encrypting and decrypting database files 212 and 214. For example, database file 212 can be encrypted such that reading content of database file 212 requires a key to decrypt database file 212. The key can be stored in the remote container associated with container data field 208. The system can limit users who can access content of database file 212 to those who can access container data field 208. The content can be rendered through the relational database or an application program using the relational database. Thus, a user's access privilege to database file 212 can be independent of the user's access privilege to storage device 226. For example, a user who does not have access privilege to storage device 226 can access content of database file 212 stored on storage device 226.

Exemplary Data Filter

Figure 3:
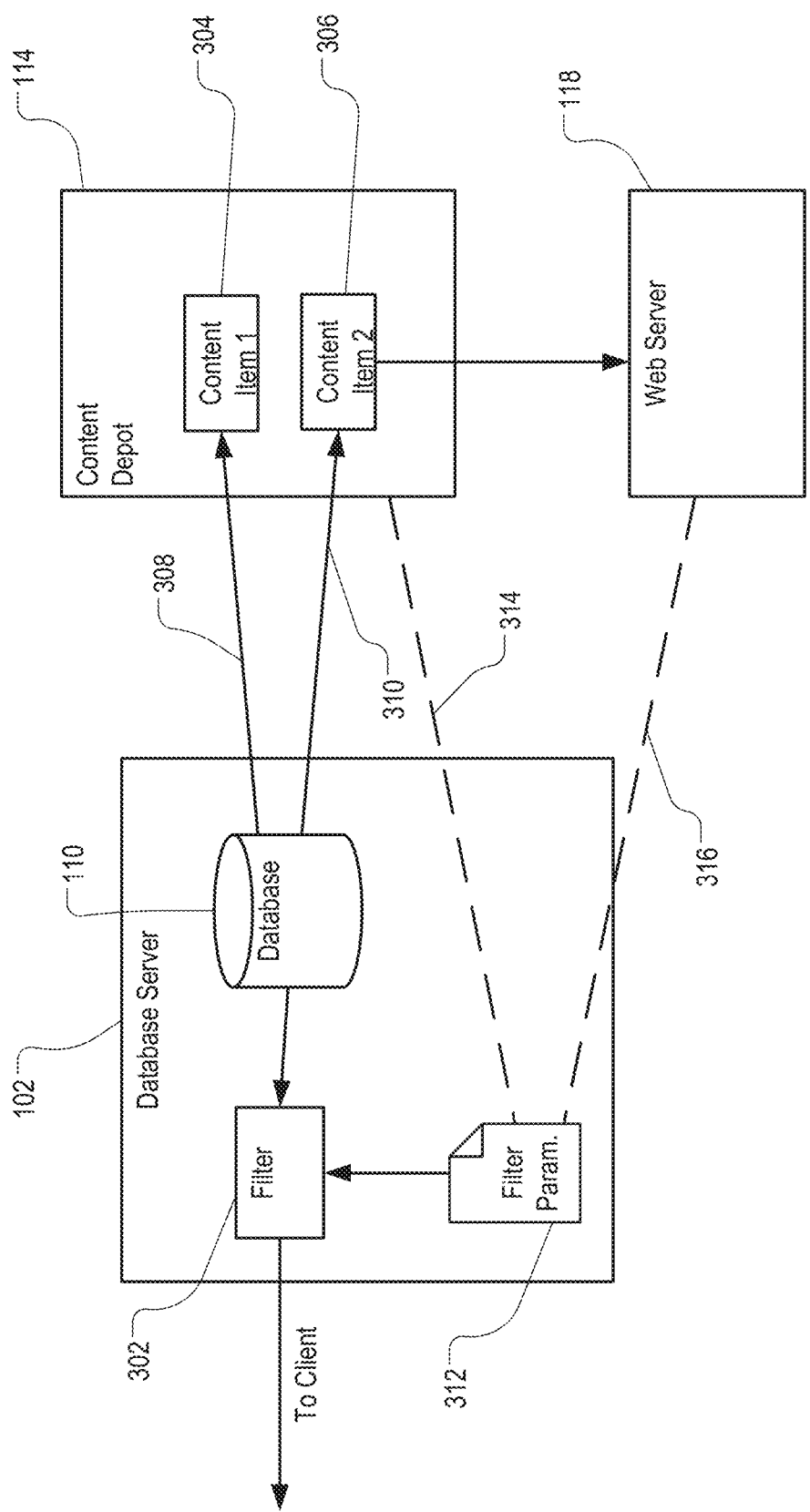
FIG. 3 is a block diagram illustrating exemplary filter techniques used in intelligent data delivery.

FIG. 3 is a block diagram illustrating exemplary filter techniques used in intelligent data delivery. The filter techniques allow database server 102 to determine when to send database data to a client in response to a request using one protocol, and when to send a reference to data to the client in response to the request using another protocol.

Database server 102 can include filter 302. Filter 302 can be a hardware or software component of database server 102 that is configured to provide different responses to a database request based on characteristics of data retrieved in response to the database request. Database 110 can store conventional data and container data. The conventional data can include data having numeric types (e.g., integer, unsigned integer, or float), a Boolean type, text types (e.g., fixed or variable length strings), date/time types, or identifier (ID) types. The container data can include data having multimedia (e.g., audio or video stream) types, data object (e.g., object linking and embedding (OLE) object) types, or file (e.g., OpenDocument™ (ODT), portable document format (PDF)) types.

When the data are container data, the actual content of the container data (e.g., content of the multimedia files), including content item 304 and content item 306, can be stored at content depot 114, separately from the conventional data. In some implementations, content item 304 and content item 306 can be stored separately from database server 102. Database 110 can store reference 308 to content item 304 and reference 310 to content item 306.

When database 110 returns data in response to a request, filter 302 can determine whether to return the data or references to the data, based on filter parameter 312. Filter parameter 312 can specify characteristics of the data and corresponding protocol, that, if the data have the specified characteristics, the data will be delivered according to the corresponding protocol. For example, filter parameter 312 can specify that if the data have container data type, and content of the data has a size of x kilobytes (KBs), then the data will be delivered using a HTTP streaming protocol. Filter parameter 312 can include reference 314 to content depot 114 and reference 316 to web server 118. Further details of filter parameter 312 will be described below in reference to FIG. 4.

Based on filter parameter 312 and the data returned from database 110, filter 302 can determine, for example, that content item 304 will be delivered to a client using a first protocol, and that content item 306 will be delivered using a second protocol that is different from the first protocol. Filter 302 can provide reference information, rather than the actual content items 304 and 306, to the client. The reference information can include, for example, references to web server 118 and content depot 114 (e.g., host names or Internet Protocol (IP) addresses) and the protocols to be used to connect to web server 118 or content depot 114 or both.

Figure 4:
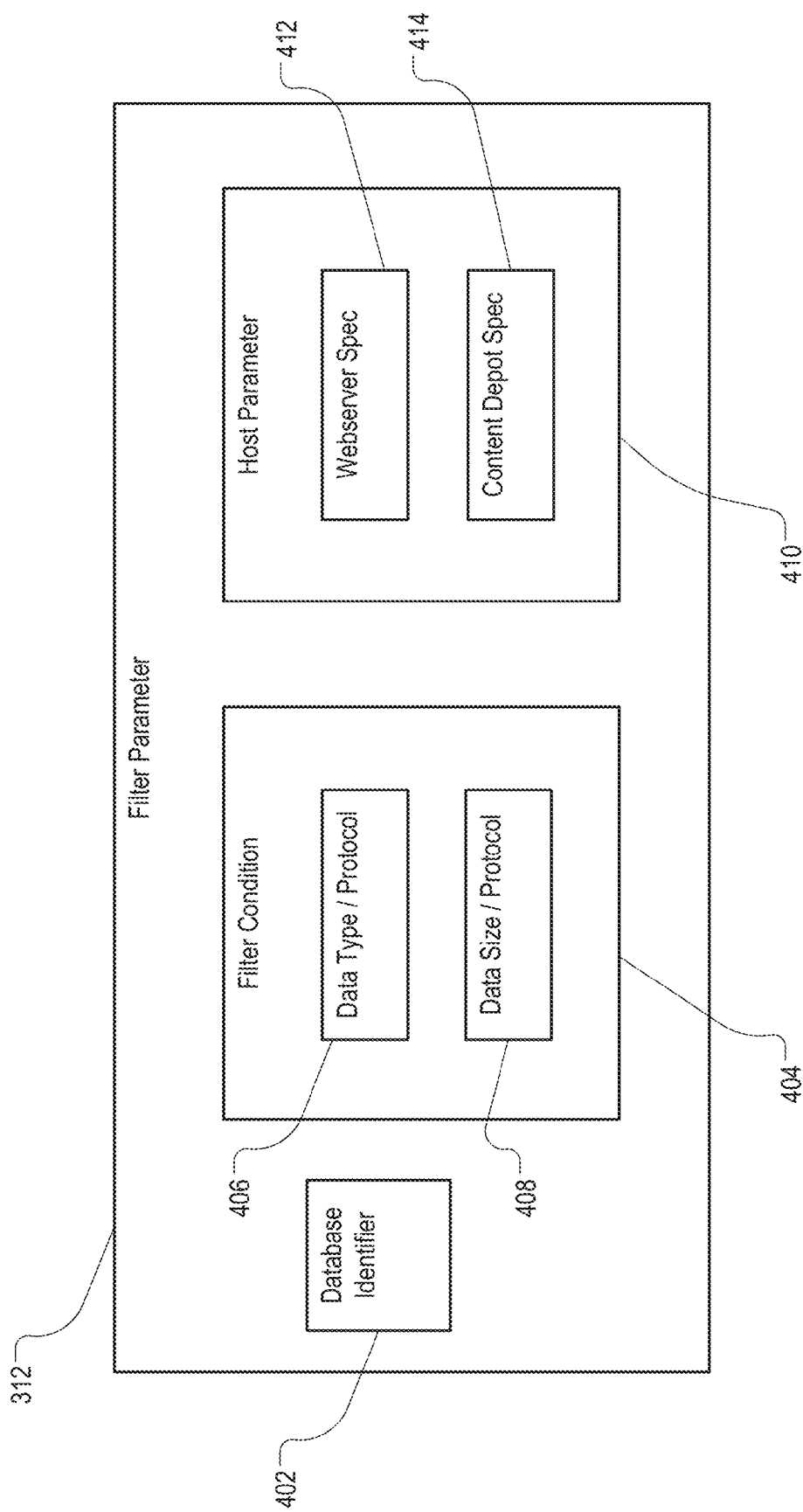
FIG. 4 is a block diagram illustrating an exemplary structure of a filter parameter.

FIG. 4 is a block diagram illustrating an exemplary structure of filter parameter 312. Filter parameter 312 can include database identifier 402. A database server can host one or more databases. A common filter can be applied to each of the one or more databases. Two databases different from one another can have different filter parameters. Database identifier 402 can specify to which database filter parameter 312 applies. Likewise, in some implementations, filter parameter 312 can include a user identifier that can make filter parameter 312 user specific.

Filter parameter 312 can include filter condition 404. Filter condition 404 can specify that when characteristics of data satisfy one or more criteria, a specified protocol will be used to deliver the data. For example, filter condition 404 can include data type condition 406 specifying that, if the data have a container data type, or if the data content is in a specified format (e.g., PDF), then deliver the data using an HTTP streaming protocol. Filter condition 404 can include data size condition 408 specifying that, if the data have a size that satisfies a threshold (e.g., x KB), then deliver the data using the HTTP streaming protocol. Likewise, filter condition 404 can include a date/time condition (e.g., if the data are inserted within the last n hours, then use protocol X), a trigger condition (e.g., if A>B, then use protocol Y), or a script condition (e.g., if a script has been executed, then use protocol Z). If none of the criteria is satisfied, the data can be delivered using a default protocol (e.g., through an existing database connection).

Filter can include host parameter 410. Host parameter 410 can include information on destination servers. The information allows a client to identify and connect to the destination servers. For example, host parameter 410 can include web server specification 412 that specifies one or more of an IP address, a hostname, or a uniform resource locator (URL) of a web server, a port number for connecting to the web server, or a password. Host parameter 410 can include content depot specification 414 that specifies a location of a content item. A client can URL encode the location and sent the encoded location to a web server as a part of a request.

Exemplary User Interface

Figure 5:
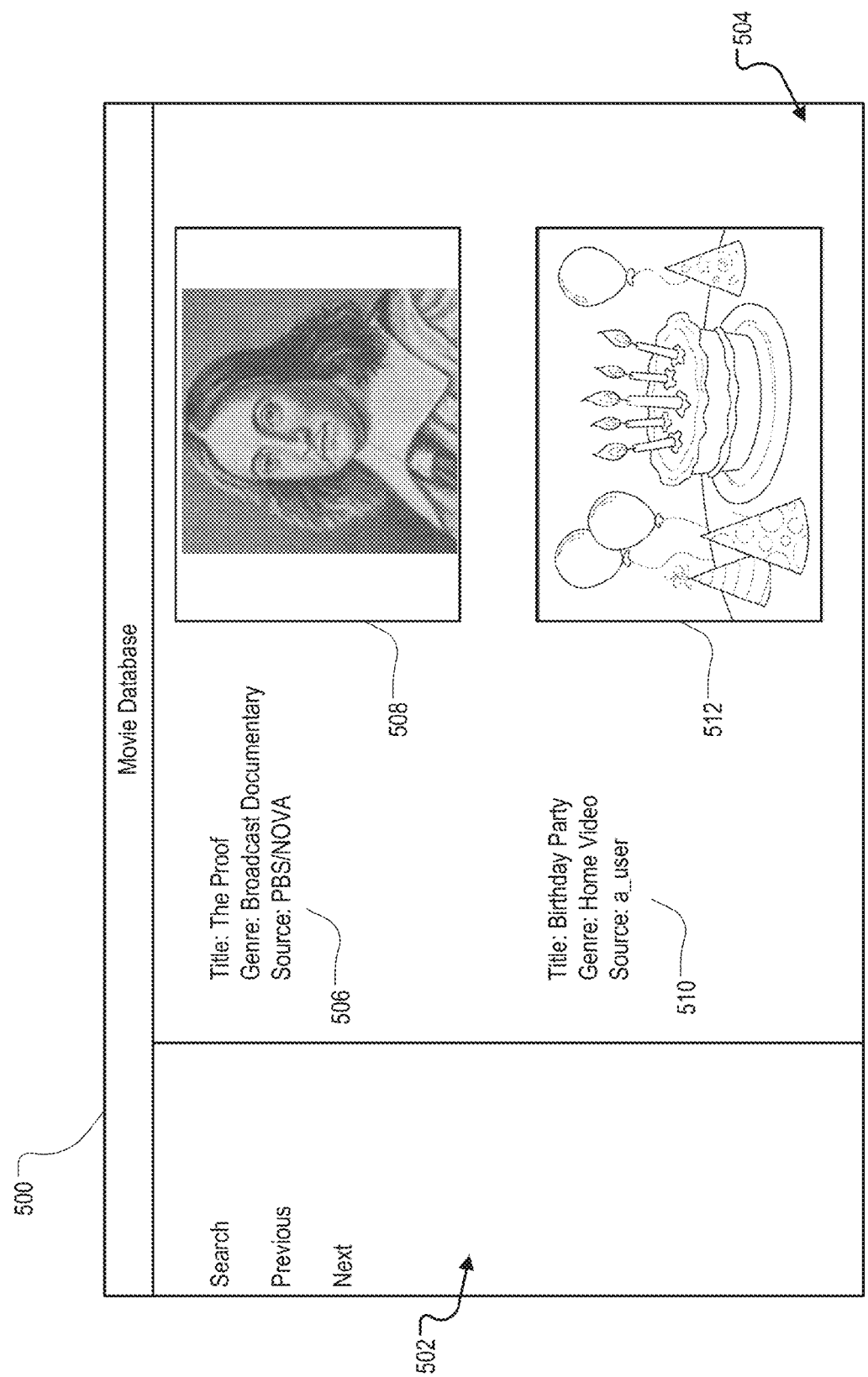
FIG. 5 is an exemplary user interface implemented on a database client receiving intelligent data delivery.

FIG. 5 is an exemplary user interface 500 implemented on a database client receiving intelligent data delivery. User interface 500 can be a graphical user interface of a database application program. In this example, the database application program connects to a movie database.

User interface 500 can include control section 502 and list view section 504. Control section 502 can be configured to receive user inputs such that the database application program can formulate a query to submit to a database server located remotely from the client device. An exemplary query formulated by the database application program can be an SQL query as shown below.

SELECT title,genre,source,content FROM movie_table; (2)

List view section 504 can be configured to display data retrieved from the exemplary movie database in response to the query. In the example shown, list view section 504 displays text display section 506 and text display section 510. Text display sections 506 and 510 are configured to display title, genre, and source as retrieved from database table "movie_table" in the database.

List view section 504 can include media display area 508 and media display area 512. Media display areas 508 and 512 are configured to display multimedia content retrieved from the database table "movie_table" in the database. In this example, the data column "content" in database table "movie_table" has a container data type. Accordingly, movie files for documentary "The Proof" and for home video "Birthday Party" are stored separately from the title, genre, and source data of the "movie_table." The database server serving the client device can have a filter having a filter parameter specifying the following.

1. Data that (a) have a container data type and (2) are larger than 512 KBs are delivered using an HTTP streaming protocol through an HTTP connection; and 2. Other data are delivered through an existing database connection.

According to data in the database, the documentary "The Proof" is larger than 512 KB, while the home video "Birthday Party" is not. Accordingly, the client device receives the movie file for "Birthday Party" through the existing connection, and, automatically and transparently, opens a new HTTP connection to retrieve the movie file for "The Proof." The two multimedia files are retrieved through different connections, and can be retrieved concurrently. As a result, content in media display areas 508 and 512 can be displayed concurrently, allowing a user to watch both movies at the same time, rather than having to wait for "The Proof" to finish downloading before seeing "Birthday Party."

Exemplary Data Delivery Processes

Figure 6:
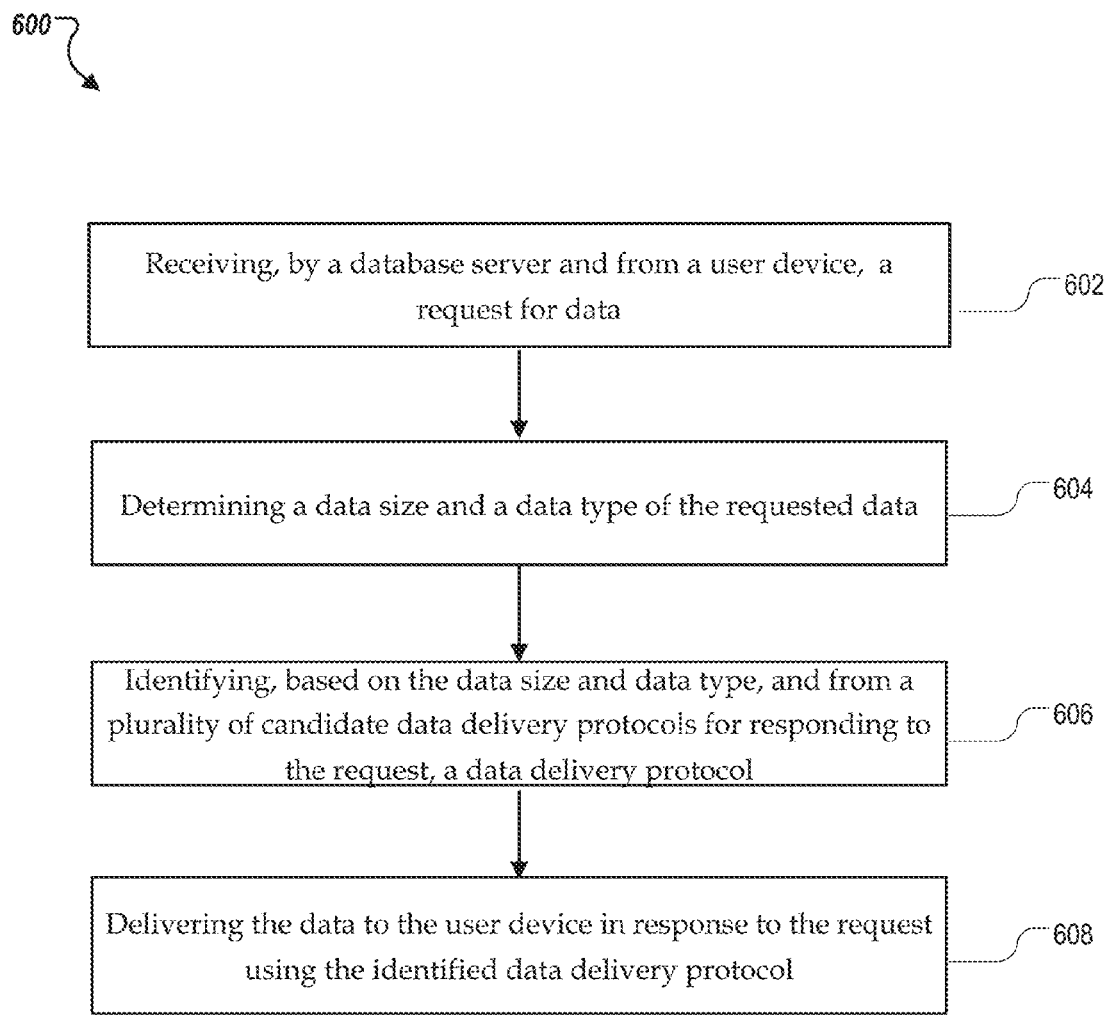
FIG. 6 is a flowchart of an exemplary process executed on a system implementing intelligent data delivery techniques.

FIG. 6 is a flowchart of exemplary process 600 executed on a system implementing intelligent data delivery. The system can include a database server (e.g., database server 102 of FIG. 1). The database server can receive (602) from a user device (e.g., client 104 of FIG. 1) a request for data. The request can include a database query (e.g., SQL query (2) as shown above).

The system can determine (604) characteristics of the requested data. The characteristics can include a data size of the requested data or data type of the requested data. Determining the data type can include determining that the requested data have a container data type. The container data type can be a data type for a database table column designated for multimedia data or data objects.

The system can identify (606), based on the characteristics of the data (e.g., the data size or data type), a data delivery protocol. The data delivery protocol can be identified from multiple candidate data delivery protocols (e.g., as specified in filter parameter 312 of FIGS. 3 and 4). The data delivery protocol can be a data protocol designated for delivering data having the characteristics (e.g., the data size or data type).

In some implementations, identifying the data delivery protocol can include determining whether the data size satisfies a pre-specified threshold. If the data size does not satisfy the threshold, the system can identify a first data deliver protocol (e.g., a pre-specified default data delivery protocol). If the data size satisfies the threshold, the system can identify a second data delivery protocol (e.g., an HTTP streaming protocol). In the latter case, the system can send, from the database server to the user device, an address of an HTTP server.

The system can deliver (608) the data to the user device in response to the request using the data delivery protocol identified in stage 606. Delivering the data can include delivering the data through a first connection when the first data deliver protocol is identified, or delivering the data through a second connection when the second data deliver protocol is identified. The first connection can be a database connection between the user device and the database server. The second connection can be an HTTP connection between the user device and an HTTP server. Delivering the data can include delivering the data to the user device using an HTTP streaming protocol through the HTTP connection between the user device and the HTTP server.

Exemplary System Architecture

Figure 7:
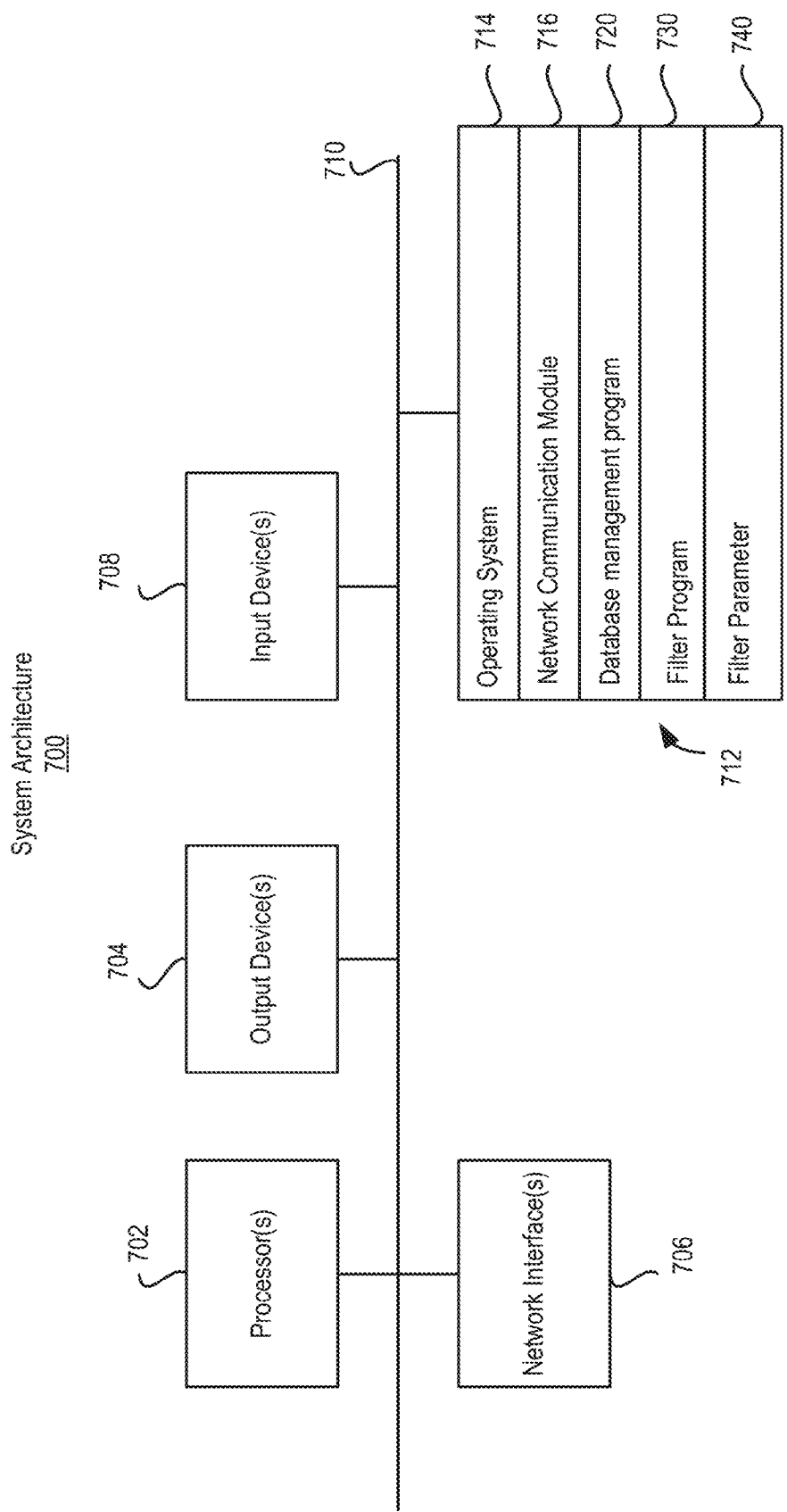
FIG. 7 is a block diagram of an exemplary system architecture for implementing the features and operations of FIGS. 1-6.

FIG. 7 is a block diagram of an exemplary system architecture 700 for implementing the features and operations of FIGS. 1-6. Other architectures are possible, including architectures with more or fewer components. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to any medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714 (e.g., Mac OS® server, Windows® NT server), network communication module 716, database management program 720, filter program 730, and filter parameter 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.).

Database management program 720 can include computer instructions that, when executed, cause processor 702 to perform operations of database server 102 as described above in reference to FIG. 1. Database management program 720 can include interfaces to one or more databases on a file system. The databases can be organized under a hierarchical folder structure, the folders mapping to directories in the file system. Filter program 730 can include computer instructions that, when executed, cause processor 702 to perform operations filter 302 as described above in reference to FIG. 3. Filter parameter 740 can include one or more filter parameters 312 as described above in reference to FIGS. 3 and 4.

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For instance, although most examples are described in reference an HTTP streaming protocol, the techniques described can be applied to any data exchange protocol.

What is claimed is:

1. A method for delivering data to a user device, the method comprising:
   by a database server:
      receiving a query from the user device;
      identifying, based on the query, at least a first file name and a second file name;
      determining a first data size and a first data type of a first file associated with the first file name;

determining a second data size and a second data type of a second file associated with the second file name;

identifying a first data delivery protocol from a plurality of candidate data delivery protocols based on: i) a filter parameter, ii) the first data size, and iii) the first data type;

identifying a second data delivery protocol from the plurality of candidate data delivery protocols based on: i) the filter parameter, ii) the second data size, and iii) the second data type;

causing a first delivery of the first file to the user device using the first data delivery protocol over a first connection; and causing a second delivery of the second file to the user device via the second data delivery protocol over a second connection, wherein the first delivery of the first file is concurrent with the second delivery of the second file, the first file is stored at the database server, and the second file is stored remotely from the database server.

2. The method of claim 1, wherein the first file is a first multimedia file and the second file is a second multimedia file.

3. The method of claim 1, wherein the second data type is a container data type.

4. The method of claim 3, wherein the filter parameter specifies that a particular data object having: i) a size exceeding a size threshold and ii) characterized by the container data type are to be delivered using a hypertext transport protocol (HTTP) streaming protocol through an HTTP connection.

5. The method of claim 4, wherein:
the first connection is a database connection, and
the second connection is a hypertext transfer protocol (HTTP) connection between the user device and an HTTP server.

6. The method of claim 5, further comprising:
sending an address of the HTTP server to the user device.

7. The method of claim 5, wherein the user device does not have access privileges to the HTTP server.

8. A non-transitory computer readable storage medium configured to store instructions that, when executed by a database server comprising one or more processors, cause the database server to deliver data to a user device, by carrying out steps that include:

receiving a query from the user device;

identifying, based on the query, at least a first file name and a second file name;

determining a first data size and a first data type of a first file associated with the first file name;

determining a second data size and a second data type of a second file associated with the second file name;

identifying a first data delivery protocol from a plurality of candidate data delivery protocols based on: i) a filter parameter, ii) the first data size, and iii) the first data type;

identifying a second data delivery protocol from the plurality of candidate data delivery protocols and based on: i) the filter parameter, ii) the second data size, and iii) the second data type;

causing a first delivery of the first file to the user device using the first data delivery protocol over a first connection; and causing a second delivery of the second file to the user device via the second data delivery protocol over a second connection, wherein the first delivery of the first file is concurrent with the second delivery of the second file, the first file is stored at the database server, and the second file is stored remotely from the database server.

9. The non-transitory computer readable storage medium of claim 8, wherein the first file is a first multimedia file and the second file is a second multimedia file.

10. The non-transitory computer readable storage medium of claim 8, wherein the second data type is a container data type.

11. The non-transitory computer readable storage medium of claim 10, wherein the filter parameter specifies that a particular data object having: i) a size exceeding a size threshold and ii) characterized by the container data type are to be delivered using a hypertext transport protocol (HTTP) streaming protocol through an HTTP connection.

12. The non-transitory computer readable storage medium of claim 11, wherein:
the first connection is a database connection, and
the second connection is a hypertext transfer protocol (HTTP) connection between the user device and an HTTP server.

13. The non-transitory computer readable storage medium of claim 12, wherein the steps further include:
sending an address of the HTTP server to the user device.

14. The non-transitory computer readable storage medium of claim 12, wherein the user device does not have access privileges to the HTTP server.

15. A database server to perform data delivery to a user device, the database server comprising:
a memory; and
a processor coupled to the memory, wherein the memory comprises instructions that when executed by the processor cause the database server to carry out steps that include:

receiving a query from the user device;

identifying, based on the query, at least a first file name and a second file name;

determining a first data size and a first data type of a first file associated with the first file name;

determining a second data size and a second data type of a second file associated with the second file name;

identifying a first data delivery protocol from a plurality of candidate data delivery protocols and based on: i) a filter parameter, ii) the first data size, and iii) the first data type;

identifying a second data delivery protocol from the plurality of candidate data delivery protocols and based on: i) the filter parameter, ii) the second data size, and iii) the second data type;

causing a first delivery of the first file to the user device using the first data delivery protocol over a first connection; and causing a second delivery of the second file to the user device via the second data delivery protocol over a second connection, wherein the first delivery of the first file is concurrent with the second delivery of the second file, the first file is stored at the database server, and the second file is stored remotely from the database server.

16. The database server of claim 15, wherein the second data type is a container data type.

17. The database server of claim 16, wherein:
the first connection is a database connection, and
the second connection is a hypertext transfer protocol (HTTP) connection between the user device and an HTTP server.

18. The database server of claim 16, wherein the filter parameter specifies that a particular data object having: i) a size exceeding a size threshold and ii) characterized by the container data type are to be delivered using a hypertext transport protocol (HTTP) streaming protocol through an HTTP connection.

\* \* \* \* \*

UNITED STATES PATENT AND TRADEMARK OFFICE
CERTIFICATE OF CORRECTION

PATENT NO. : 9,575,968 B2  
APPLICATION NO. : 14/726394  
DATED : February 21, 2017  
INVENTOR(S) : Wang et al.

Page 1 of 1

It is certified that error appears in the above-identified patent and that said Letters Patent is hereby corrected as shown below:

In the Claims

Column 1, Line 9: delete "U.S. patent application Ser. No. 13/245,603, entitled "Intel-" and insert -- U.S. patent application Ser. No. 13/345,603, entitled "Intel- --.

Signed and Sealed this
Twenty-eighth Day of March, 2017

Michelle K. Lee
*Director of the United States Patent and Trademark Office*